United States Patent
Milojicic et al.

(10) Patent No.: US 12,405,791 B2
(45) Date of Patent: Sep. 2, 2025

(54) DYNAMIC COMMUNICATION ARCHITECTURE FOR DECENTRALIZED HETEROGENOUS ACCELERATORS

(71) Applicant: HEWLETT PACKARD ENTERPRISE DEVELOPMENT LP, Spring, TX (US)

(72) Inventors: Dejan S. Milojicic, Milpitas, CA (US); Kaiwen Cao, Spring, TX (US); Aditya Dhakal, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 335 days.

(21) Appl. No.: 18/309,203

(22) Filed: Apr. 28, 2023

(65) Prior Publication Data

US 2024/0362022 A1    Oct. 31, 2024

(51) Int. Cl.
*G06F 9/30* (2018.01)
*G06F 9/38* (2018.01)

(52) U.S. Cl.
CPC .......... *G06F 9/3005* (2013.01); *G06F 9/3877* (2013.01)

(58) Field of Classification Search
CPC .... G06F 9/3005; G06F 9/3877; G06F 9/5044; G06F 9/505
See application file for complete search history.

(56) References Cited

U.S. PATENT DOCUMENTS

| | | | | |
|---|---|---|---|---|
| 8,365,184 B2* | 1/2013 | Carter | ................. | G06F 9/5027 702/182 |
| 10,740,152 B2* | 8/2020 | Bobba | ................. | G06F 9/5044 |
| 10,817,353 B1* | 10/2020 | Kain | ................. | G06F 9/545 |
| 11,915,041 B1* | 2/2024 | Tanach | ................. | G06F 9/4881 |
| 2013/0198366 A1* | 8/2013 | Branson | ................. | G06F 9/5055 709/224 |
| 2016/0127212 A1* | 5/2016 | Guminy | ................. | H04L 41/5025 709/224 |
| 2024/0256333 A1* | 8/2024 | Weber | ................. | G06F 9/5044 |

OTHER PUBLICATIONS

Harris, M., "Unified Memory for CUDA Beginners," Jun. 19, 2017, Technical Blog, 6 pages, https://developer.nvidia.com/blog/unified-memory-cuda-beginners/.
Jones, T. et al., "UNITY: Unified Memory and File Space," Jun. 27, 2017, 8 pages.
Pinto, C. et al., "A Virtualization Framework for IOMMU-less Many-Core Accelerators," Jun. 2014, ResearchGate, 9 pages,.
Sakharnykh, N., "Maximizing Unified Memory Performance in CUDA," Nov. 19, 2017, Technical Blog, 6 pages.
Xu, H, et al., "Machine Learning Guided Optimal Use of GPU Unified Memory," Nov. 15, 2019, IEEE/ACM Workshop on Memory Centric High Performance Computing (MCPHC), 7 pages.

* cited by examiner

*Primary Examiner* — Farley Abad
(74) *Attorney, Agent, or Firm* — Dickinson Wright

(57) ABSTRACT

Systems and methods are provided for a dynamic communication architecture that can include decentralized heterogenous accelerators, and an operation of mapping corresponding decentralized virtualized accelerators. The mapping of corresponding decentralized virtualized accelerators is performed on top of, for example, a memory-mapped multi-accelerator communication architecture to enable effective and flexible sharing of data. The mapping can be dynamically adjusted with regard to the workload running by analyzing workflow communication.

18 Claims, 9 Drawing Sheets

DYNAMIC COMMUNICATION ARCHITECTURE FOR DECENTRALIZED HETEROGENOUS ACCELERATORS

BACKGROUND

With the convergence of artificial intelligence (AI), high performance computing (HPC), and data analytics (DA) workflows, multiple different workflows need to execute efficiently and/or concurrently to accomplish a task, running potentially on a number of heterogeneous accelerators, central processing units (CPUs) and networks. Centralized CPU-accelerator memory-mapped solutions have been used for rigid, static mapping of accelerators onto a communication architecture. However, the scaling of different, large-scale workflows (and especially in, for example, AI/HPC/DA workflows) frequently employs multiple heterogenous accelerators to communicate efficiently. But communication using multiple heterogenous accelerators is inconsistent and often-times slow, usually resulting in decreased performance and poor overall system efficiency.

BRIEF DESCRIPTION OF THE DRAWINGS

The present disclosure, in accordance with one or more various examples of the disclosed technology, is described in detail with reference to the following figures. The figures are provided for purposes of illustration only and merely depict typical or example aspects of the disclosed technology.

Figure 1A:
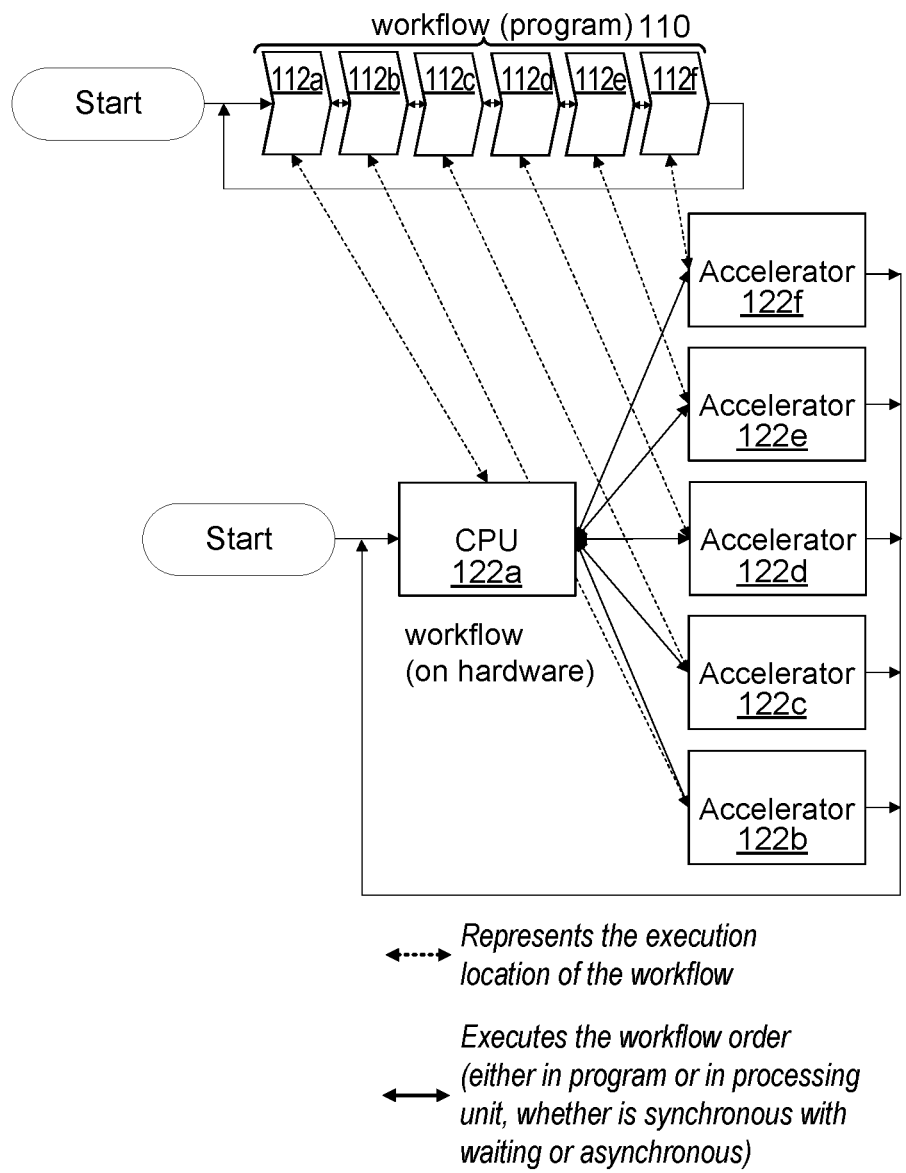
FIGS. 1A-1B illustrate communication architecture systems depicting execution locations of workflows and executions of the workflow order, in accordance with examples described herein.

The figures are not exhaustive and do not limit the present disclosure to the precise form disclosed.

DETAILED DESCRIPTION

It is to be understood that the figures and descriptions of the disclosed technology may have been simplified to illustrate elements that are relevant for a clear understanding of the disclosed technology, while eliminating, for purposes of clarity, other elements found in a typical accelerator system, typical communication architecture system, typical method of using an accelerator system, or typical method of using a communication architecture system. Those of ordinary skill in the art will recognize that other elements may be desirable and/or required in order to implement the disclosed technology. However, because such elements are well known in the art, and because they do not facilitate a better understanding of the disclosed technology, a discussion of such elements is not provided herein. It is also to be understood that the drawings included herewith only provide diagrammatic representations of the structures of the disclosed technology and that structures falling within the scope of the disclosed technology may include structures different than those shown in the drawings. Reference will now be made to the drawings wherein like structures are provided with like reference designations.

Before explaining at least one example of the disclosed technology in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented devices, structures, apparatuses, systems, methods, features, and advantages will be or become apparent to one with skill in the art upon examining the drawings and the detailed description herein. It is intended that all such additional devices, structures, apparatuses, systems, methods, features, and advantages be protected by the accompanying claims.

For purposes of this disclosure, the phrase "communication architecture" refers to a high-level definition that hides the complexity in the backend and the exact implementation can be dependent on the hardware.

For purposes of this disclosure, the phrase "common abstraction" refers to a common interface whereby a programmer can use the same (common) interface to coordinate the communication regardless of topology between accelerators.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As described more fully below, examples of the disclosed technology are directed to mapping virtualized accelerators on top of a memory-mapped multi-accelerator communication architecture, and dynamically adjusting the mapping with regard to the running workload in terms of latency (execution time) and throughput. Thus, examples of the disclosed technology select an optimal communication mechanism between system components. In doing so, the system considers the latency, bandwidth/throughput and, optionally, the data transmission pattern in selecting a communication architecture (between system components such as CPU and multiple accelerators), while coordinating the communication architecture with the underlying processing mechanism (i.e., the workflow code execution components). During runtime, adjustments to the change of workflow are made to ease the management of such system components.

For purposes of this disclosure, an accelerator is a computing machine which includes a co-processor linked to a central processor that is capable of accelerating the execution of specific computational intensive kernels, so as to speed up the overall execution according to Amdahl's law. An end-application contains multiple computational kernels and the properties of these parts are better executed by a particular accelerator which can also be other computing machines such as, for example, a field-programmable gate array (FPGA), coarse-grained reconfigurable architecture (CGRA), graphics-processing unit (GPU), neural processing unit (NPU), Data Processing Unit (DPU), vision processing unit (VPU), application-specific integrated circuit (ASIC), tensor processing unit (TPU), SmartNIC (smart network interface card), and even a central processing unit (CPU). A kernel is the code that runs inside the accelerators. So usually a kernel uniquely runs on each one of these accelerators. Although kernels could be replicated, they could be partitioned across each accelerator. But usually they are uniquely mapped on different, particular accelerators.

The communication architecture described in any example of the disclosed technology can be applied between heterogeneous accelerators of various types of computing machines such as CPUs, FPGAs, GPUs, etc. as described above. The communication architecture can be applied between categorically similar computing machines (e.g., GPU-to-GPU), or can be applied between categorically different computing machines in various combinations (e.g., GPU-to-FPGA). Alternatively, the communication architecture described in any example of the disclosed technology can be applied between homogeneous accelerators.

As mentioned above, communication using multiple heterogeneous accelerators can be inconsistent and often-times slow, usually resulting in decreased performance and poor overall system efficiency. These drawbacks become more prevalent in large-scale computing systems including artificial intelligence (AI), high performance computing (HPC), and data analytics (DA) workflows. To overcome these drawbacks, a solution that uses a dynamic communication architecture system, and that eases programming and management of the system is provided herein.

Large-scale computing systems leverage a heterogeneous collection of computing machines/accelerators (e.g., FPGAs, GPUs, etc.) with different performance requirements and workload categorizations and capabilities (e.g., memory capacity, function, etc.) to execute a mixture of heterogeneous collection of workloads (e.g., stateless function calls, long-running services, batch data analytics, interactive development and testing, etc.) within a workflow. The workloads implement instructions via a code execution order governed by a workflow. The workloads within the workflow can enable each of the instructions, for example, by assigning the workloads to different computing resources in the computing system.

There are different workflow tasks that are suitable for running on different heterogenous accelerators due to their different performance requirements and workload categorizations. For example, a GPU is suitable for a throughput-oriented workload, whereas an FPGA is suitable for a latency-sensitive workload. The overall performance within heterogeneous accelerator environments should be improved because of the mixture of these workloads and also because of system efficiencies. The multiple accelerators need to communicate efficiently because workflows scale out to different accelerators and even across nodes. Accordingly, examples of the disclosed technology address how an underlying detailed communication mechanism involving these different workflow tasks can be abstracted into a unified communication interface so that the programming effort is eased, and so overall system efficiencies (that are otherwise gained by using heterogenous accelerators) are not sacrificed.

Working with heterogeneous accelerators that employ different communication methods can result in errors in compatibility and which can therefore be tedious for each of the components to effectuate communication efficiently. Therefore, there exists a need to provide unification using a single interface so that the user doesn't need to worry about the details of communication underneath the interface. This desirable common abstraction scheme provides a high-level visualization to the programmer that eases the programming effort. With this common abstraction, much of the elements are virtualized, such as the computing power, PCIe, network, as well as the priority of the kernel executions. These unified abstractions also may include internal communications that occur between computing machines.

Analysis of kernel and workflow communications also may enable a self-adjustable and dynamically reconfiguration communication architecture. In particular, accelerators will have affinity detection, binding, and unbinding to the kernels and also the data, in order to reduce the data movement in the clusters. This approach may also allow for a change in the protocol or the protocol semantics of the data exchange. Through this self-management and adjustability, the server can achieve better robustness and efficiencies.

Large-scale computing systems, such as those including AI/HPC/DA workflows, may include a large quantity of nodes (e.g., numbering in the tens of thousands), each of which may have associated resources. Some large-scale computing systems may employ processing resources, memory, accelerators, and other resources that are assignable to users at levels as may be requested by the users. Operating systems and kernels may be run on some or all of the nodes, and in some cases, different types, versions, or instances of kernels may be run on different nodes in the system. The system nodes (i.e. intra-nodes) and the resources therein may communicate with each other via distributed inter-node communication over a fabric.

As discussed more fully below, a unification of inter-node and intra-node, memory-mapped, decentralized accelerator communication mechanism, results in a new, dynamic communication architecture. An inter-node means communication amongst accelerators across different servers, and intra-node means communication amongst accelerators within a particular server. This unified and dynamic memory-mapped multi-accelerator communication architecture provides a common abstraction for (e.g., heterogeneous) accelerators within a compute node and across the nodes to the programmer. In other words, the dynamic communication architecture allows a programmer to use the same/unified interface to coordinate the communication regardless of various different topology between accelerators, and without knowing the details for communication within the communication architecture underneath the virtualized accelerators. This underlying communication architecture and its unified interface provide the high-level definition that can be implemented in many ways underneath the virtualized accelerators and optimized for data locality and data flow awareness, as discussed more fully below. Since all of the communication details may not be seen and exposed by the programmer, the communication may instead be conveyed by the programmer via an API set that the programmer works with.

With reference to memory-mapped communication, each accelerator has a memory and one accelerator can read from another accelerator's memory or write to another accelerator's memory. Each accelerator memory is exposed and mapped, thereby allowing an accelerator to write to (or read from) another accelerator's memory. An accelerator communication mechanism is inter-nodal and therefore there is no central entity. Because of the decentralization, one server communicates with another server without going through a central entity. This is in contrast to a coordinating central server which receives a request from one server and routes the request to another server. This centralized approach usually involves a host entity to coordinate every communication between different accelerators working across different servers. For example, one accelerator that wants to communicate with another accelerator might go through the host. Such extra coordination using the host can be very tedious and limiting as it also lacks peer-to-peer direct communications. Moreover, the mapping in the centralized approach is static during the execution and therefore, it is desirable to provide more flexibility in the communication architecture to efficiently use the different capabilities of the underlying computing hardware.

Another benefit in using a communication architecture that includes virtualized accelerators is that each accelerator or portions thereof can function or appear as if it were multiple accelerators. This allows some flexibility in sharing small portions of one accelerator with other accelerators. Using virtualized accelerators within a communication architecture also allows for dynamic changing of the mapping (based on, for example, how large a particular virtual accelerator can appear, how much compute power a virtual accelerator has depending on data locality, as well as what data communication pattern is used). This virtualized configuration also allows for a management capability that visualizes what kind of data is there to process, how much accelerator is desired, how that data is to be routed to the virtual accelerator, etc. The computing elements on top of the accelerators and other computing machines can all be virtualized. Mapping virtualized accelerators on top of the communication network is done to ease management. The accelerator itself is virtualized for the purpose of supporting multi-tenancy (for both virtualized and physical/bare-metal accelerators) and this virtualized accelerator is mapped to the virtualized communication architecture underneath. Once virtual accelerators are mapped to the communication architecture underneath, programmers can build the virtual cluster on top of various communication mechanisms transparently. The communication network also may consider the data streaming and data movement and also the current characteristics of the workload. For data retention, the current characteristics can relate to read-only, modify, delete after, read, etc. The virtualization may enhance the security, especially in the case of the multi-tenant execution, by using data isolation and a zero-trust data access model across clients.

Figure 1B:
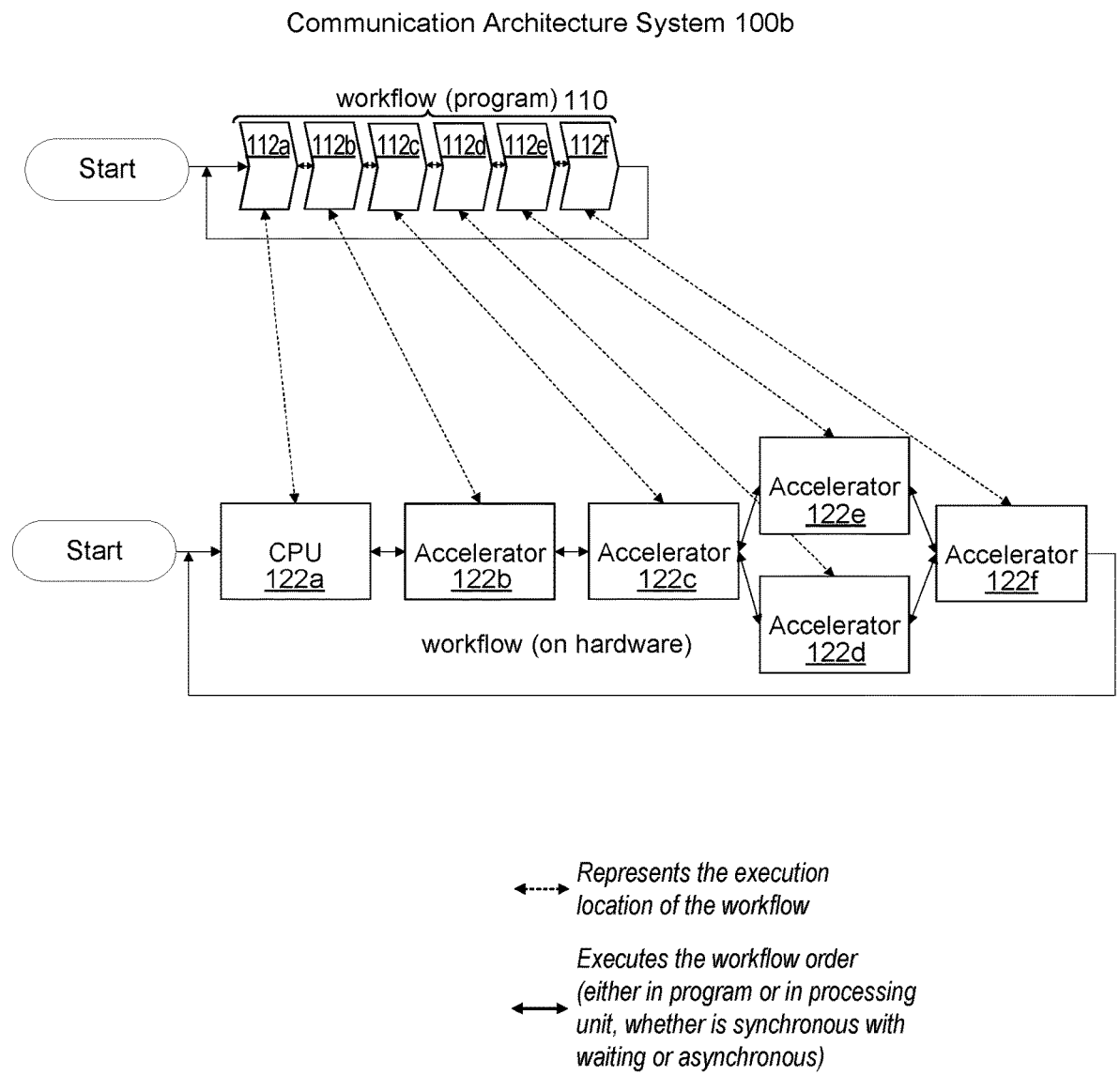

FIGS. 1A and 1B respectively illustrate example communication architecture systems 100a, 100b depicting execution locations of a workflow (i.e., program code) 110 and executions of the workflow order. FIGS. 1A and 1B show details on how the workflow 110 is divided into different chunks (i.e., workflow code execution components 112a-112f) which are mapped to the CPU 122a and the different accelerators 122b-122f. The dashed lines illustrated in FIGS. 1A and 1B represent the execution location of the workflow. In other words, the dashed lines represent logical operations that execute on the CPU 122a and the accelerators 122b-122f. In contrast, the solid lines represent an execution of the workflow order (either from a program or a processing/computing unit). In other words, the solid lines represent the communication between computing machines that actually occurs. In the communication architecture system 100a shown in FIG. 1A, all the accelerators 122b-122f are connected directly to the CPU 122a. This architecture shows that there is some communication (i.e., via workflow code execution component 112a) to accelerators 122b-122f that has to first go through the CPU 122a. Alternatively, each of the workflow code execution components 112a-112f within workflow 110 shown in FIG. 1A could instead first go through the CPU 122a and then to a corresponding accelerator (any one or more of accelerators 122b-122f). With this alternative routine, the workflow code execution components 112a-112f can communicate to the CPU 122a, and then the CPU 122a communicates to the accelerators 122b-122f. Thus, the workflow code execution components 112a-112f are communicating with the accelerators 122b-122f via the CPU 122a. FIG. 1B shows a different communication architecture system 100b whereby the accelerators 122b-122f are connected to (and communicate to) each other in a generally serialized chain (i.e., with the exception of accelerators 122d, 122e which are connected in parallel between accelerators 122c, 122f. It is noted that although FIGS. 1A and 1B show workflows that are mapped, a workflow manager (not shown) may be employed to coordinate workflow deployment on top of different computing machines.

Figure 2:
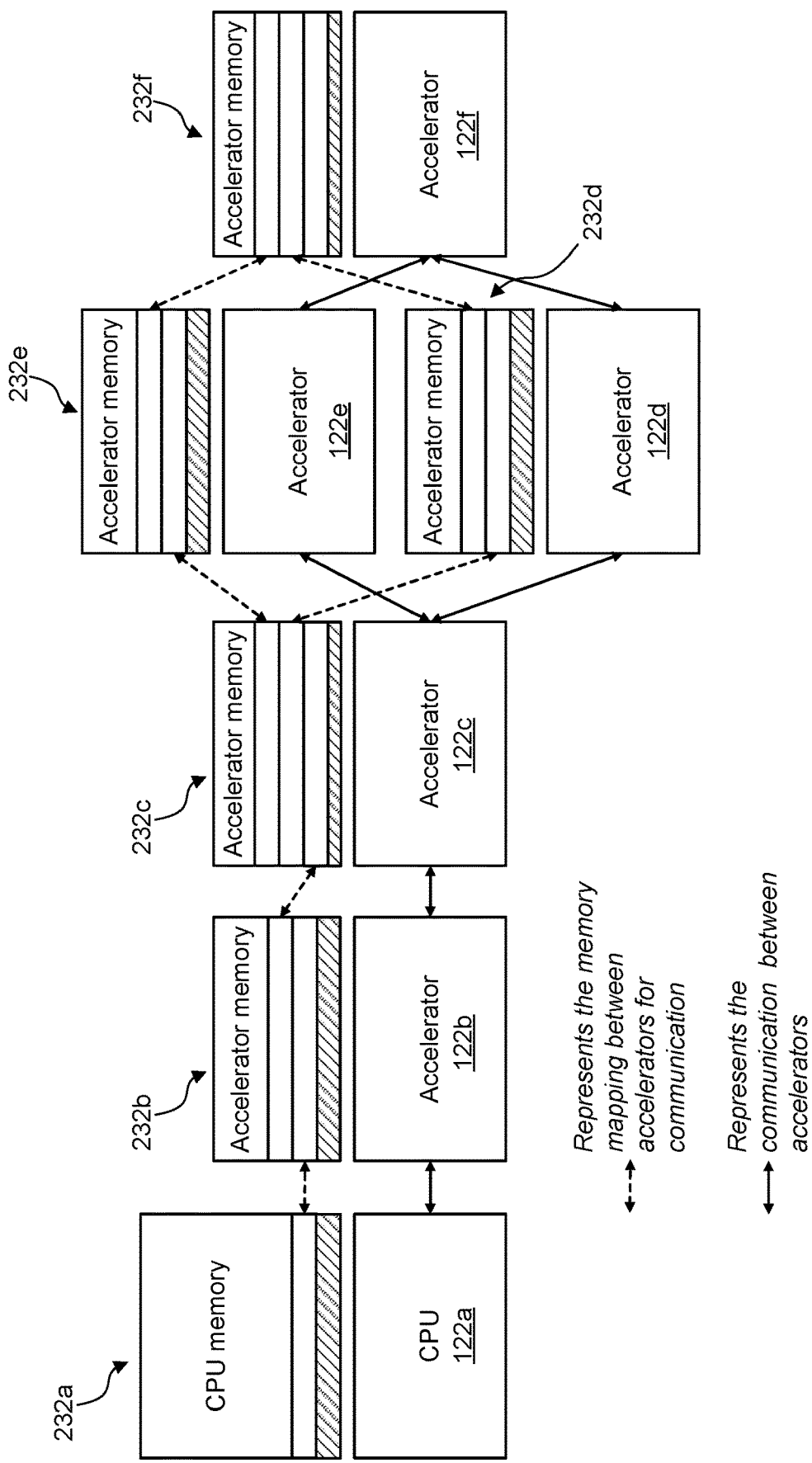
FIG. 2 illustrates a memory-mapped communication architecture depicting memory mapping between accelerators and corresponding communication between the accelerators, in accordance with one or more examples described herein.

Referring now to FIG. 2, an example memory-mapped communication architecture 200 is illustrated. The memory-mapped communication architecture 200 includes memory mapping between the CPU memory 232a and accelerator memories 232b-232f, and corresponding communications between the CPU 122a and accelerators 122b-122f. The CPU 122a and accelerators 122b-122f may be the ones shown in the communication architecture system 100b of FIG. 1B. In FIG. 2, the solid lines represent actual communications between accelerators and the dashed lines represent memory mapping communications between accelerators. In the communication architecture 200, the accelerator memories are exposed to other accelerator's memory for communications therebetween, allowing for reading writing, modifying, etc. a memory from another computing machine. As an example, accelerator memory 232b from the accelerator 122b is reading from a chunk of CPU memory 232a from the CPU 122a. The chunk of CPU memory 232a is being copied or transferred to the accelerator memory 232b. And a chunk of the accelerator memory 232b is being copied or transferred to the accelerator memory 232c from the accelerator 122c.

Regardless of the particular memory-mapping shown in the example memory-mapped communication architecture 200 shown in FIG. 2, examples of the disclosed technology establish a communication architecture on a workflow-by-workflow basis. The workflow in FIGS. 1A and 1B sets up the workflow from a CPU to another accelerator.

This sets up a communication architecture across various processing elements which comprise a CPU and different accelerators to enable workflow execution in an efficient way. Many problems with mapping workflows and accelerators exist, especially for workflows representing, for example, large AI models that can be mapped on CPU and accelerator memories, so being able to communicate effectively across these computing machines using shared memory is quite advantageous. Examples of the disclosed technology map the accelerator memories to establish this effective communication architecture to be able to efficiently execute workflows.

As discussed briefly above, examples of the disclosed technology are also directed to a unified programming interface for programmers to ease their programming efforts. Users do not need to know the details for communication underneath the unified interface. The unified interface and its underlying communication architecture provide the high-level definition that can be implemented in many ways underneath and optimized for data locality and data and workflow awareness. In an example, within a node, there is memory mapping used for the shared virtual memory and in particular for the shared memory of, for example, FPGAs and GPUs which are two types of accelerators that can share a single virtual address. This enables FPGAs and GPUs to access each other's memory transparently and maintain coherence. An alternative underlying communication architecture can include peer-to-peer communication through a PCIe bus/switch. In an example peer-to-peer setting, one of the accelerators can initiate data request or can push the data to the other accelerators without host intervention.

This memory-mapped technique may also be used inter-nodally. For example, across the nodes, the underlying communication architecture can use a memory-mapped mechanism. This can be implemented using remote direct memory access (RDMA), or by using load and store semantic for better efficiency and ease of programming if the fabric supports such an interface. An alternative implementation can use peer-to-peer message passing directly between two nodes for better scalability and reliability.

This implementation using the underlying communication architecture can resolve a data flow pattern (such as deciding which device will access data next). The underlying communication architecture does this by analyzing the workflow and making sure that the data is located on memory accessible by the accelerator that will process the data next.

With reference to providing a common abstraction, no matter what lies underneath, a topology-aware solution (at the interface) allows the programmer to automatically decide the best method to communicate. For example, the programmer can easily choose a particular communication amongst peer-to-peer (decentralized), direct, or centralized communications, based on the data exchange pattern. In an example, if the data exchange is simple and happens between two accelerators, peer-to-peer communication is selected. If the data exchange is fine-grained and needs to coordinate between multiple accelerators, centralized communication is selected. It is therefore evident that different communication mechanisms are suitable in different workflows, all requiring no host intervention at the programmer's interface. This is a reason why a common abstraction is desired, i.e., to ease the programming effort.

With reference to virtualization of the communication architecture, when there are multiple users running on a single physical hardware, virtualization will provide isolation for each user and can also provide different scheduling policies to, for example, higher priority jobs. Additionally, this can be scaled out to different compute nodes. For example, fabric attached memory and RDMA capabilities with available fabrics allow for low latency communication between the different compute nodes.

Figure 3:
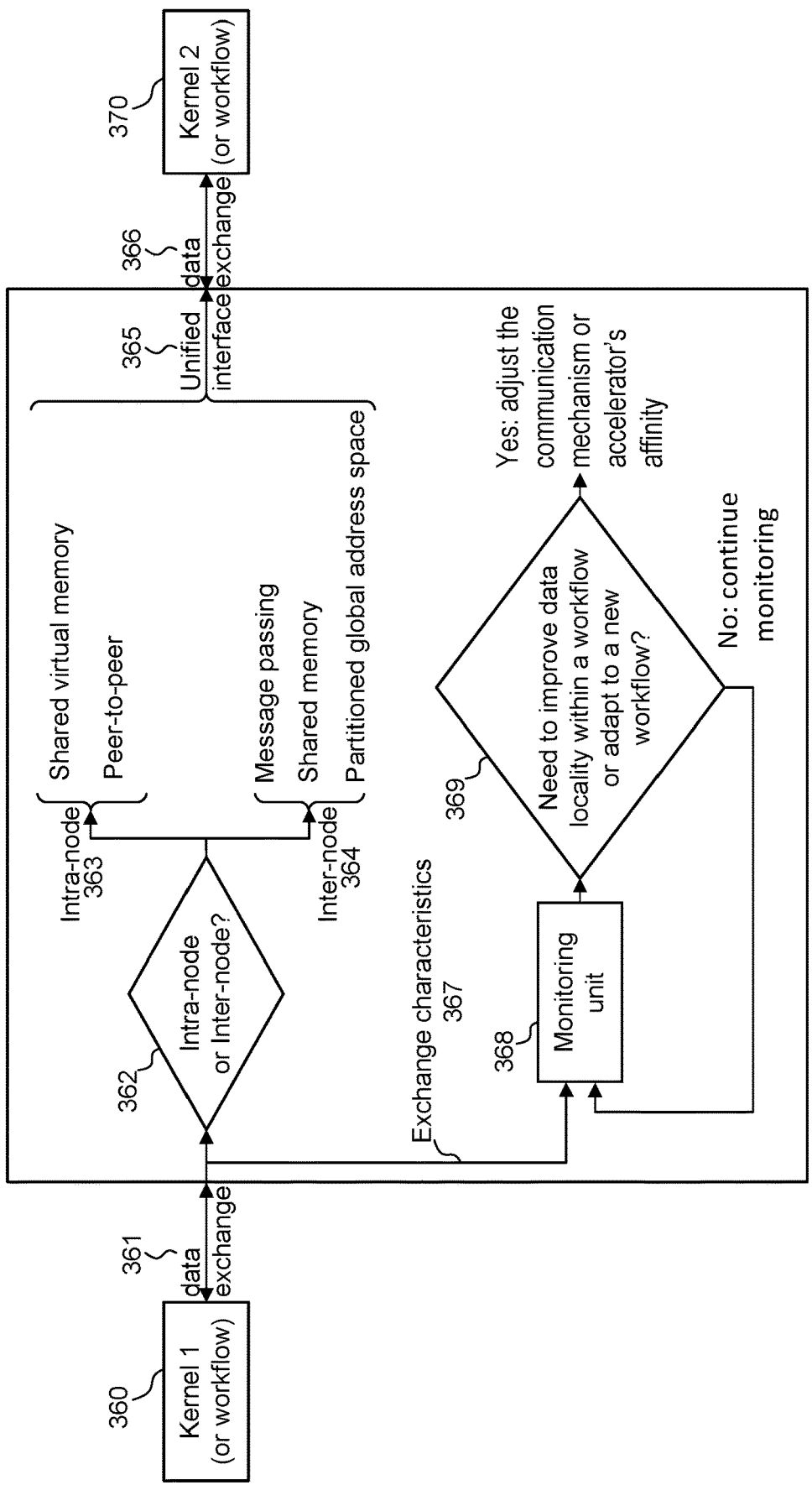
FIG. 3 illustrates a common abstraction to a programmer for exposing a uniform interface that eases the programming effort, in accordance with one or more examples described herein.

Referring now to FIG. 3, an example common abstraction to a programmer 300 for exposing a uniform interface that eases the programming effort is illustrated. The figure shows a kernel 1 360 (or workflow) and the data being exchanged (via data exchange 361, and eventually via data exchange 366 provided by unified interface 365) to the core kernel 2 370, for direct use by the programmer. The programmer doesn't see what is between kernel 1 360 and kernel 2 370. The invisible internals are provided within the node or internal to another node (via an inter-node inquiry and subsequent communication). As shown in FIG. 3, a decision 362 is made whether the data exchange is intra-node or inter-node. If the data exchange is intra-node 363, then the data is communicated using shared virtual memory or peer-to-peer transfer. If the data exchange is inter-node 364, then the data is communicated using message passing, shared memory, or partitioned global address space. A monitoring unit 368 monitors exchange characteristics 367 (e.g., data locality) within the data exchange 361. The monitoring unit 368 detects how much data has to be moved, and where it has to be moved. Based on the monitored exchange characteristics 367 of the data exchange 361, an output of the monitoring unit is then sent for decision 369 as to whether there is a need to improve data locality within a workflow or adapt to a new workflow. If there is no need to improve data locality within a workflow or adapt to a new workflow, then the monitoring unit 368 continues to monitor the data exchange 361. If there is a need to improve data locality within a workflow or adapt to a new workflow, then the communication mechanism or accelerator's affinity is adjusted.

In order to implement self-adjustability, the monitoring unit 368 can analyze the semantics of kernel invocation (e.g., how much data it needs, when its kernel is invoked, etc.) and data communication patterns on the fly. For example, it can identify from which accelerators or nodes the kernel is pushing or pulling the data, how much data is transferred, and/or how often the data is transferred. Also, the monitor unit 368 can analyze the data affinity of accelerators with regard to the memory pool. For example, it can ascertain whether the data is passing between accelerators, or staying on a single accelerator. This determination made by the monitoring unit 368 can dynamically bind or unbind virtual accelerators for kernel execution to improve data locality within a workflow and keep the data on the accelerators as long as possible, or adapt to a new workflow.

In order to choose the best communication method for intra-node 363 or inter-node 364 communications, a model (analytical or graph-based) can be used to choose the best communication mechanism. The model may consider the latency, bandwidth, and/or data transmission pattern to select the best communication architecture. During the runtime, the model can be updated to reflect the system status.

With reference to implementation of the virtualization described above, virtualized accelerators may be mapped on top of the communication architecture. This communication architecture can support multi-tenancy for both virtualized as well as bare-metal accelerators. An example of this virtualization can be for GPU virtualization, where it can be for Multi-Instance GPUs, Multi-Process Service and other similar technologies. A GPU can also use container technology to enable a more flexible sharing at software level. Those software technologies enable flexible sharing. Another example of this virtualization can be for FPGA virtualization, where it can be achieved using multiple dynamic partial reconfigurations for multiple tenancy. Alternatively, an FPGA shell can be used to enable sharing of more resources. To accommodate some accelerators (e.g. CGRA) that may not have a good support for virtualization or multi-tenant sharing, an illusion can be created that the accelerators have the property of virtual accelerators by static partitioning (i.e., resulting in multi-tenancy). In other words, an illusion is created that accelerators have the properties of virtual accelerators by statically partitioned accelerators.

Once virtual accelerators are mapped to the communication architecture underneath, a programmer can build the virtual cluster on top of various communication mechanism transparently. The accelerators may have different available communication hardware and communication capability. Accelerators (both virtual and physical) are mapped to a communication architecture. Accelerators register their available communication hardware (PCIe, fabric such as NVLink and Infiniband) and communication capability (bandwidth/latency to host and other accelerators) to aid choosing best method to communicate.

And the different communication architecture is instantiated on-demand when the request comes and this can reduce unnecessary waste of the hardware resources. Each virtual accelerator will register its communication architecture when it is instantiated. When to instantiate the communication architecture, depends on the data processing pattern and mechanism. Each virtual accelerator that registers different communication architecture is mapped to the same or different physical hardware.

The data processing mechanism used by kernels in accelerators can be streaming and/or non-streaming and any data retention is workflow dependent. This data retention might have characteristics such as: (1) read-only; (2) modified after read; (3) data is deleted after read, etc. The communication architecture handles the data read mechanism as well as data retention, etc., transparently.

The use of virtualization will generally guarantee security by enabling stricter sharing if a user requires a higher security requirement. For example, Multi-Instance GPU sharing enables more isolation compared to the container running on a GPU. Enabling the data isolation for virtualized accelerators that share the same physical accelerators and tenant isolation for large-scale workflow can take up the whole node. In other words, the same physical node can take up an entire compute node.

Figure 4:
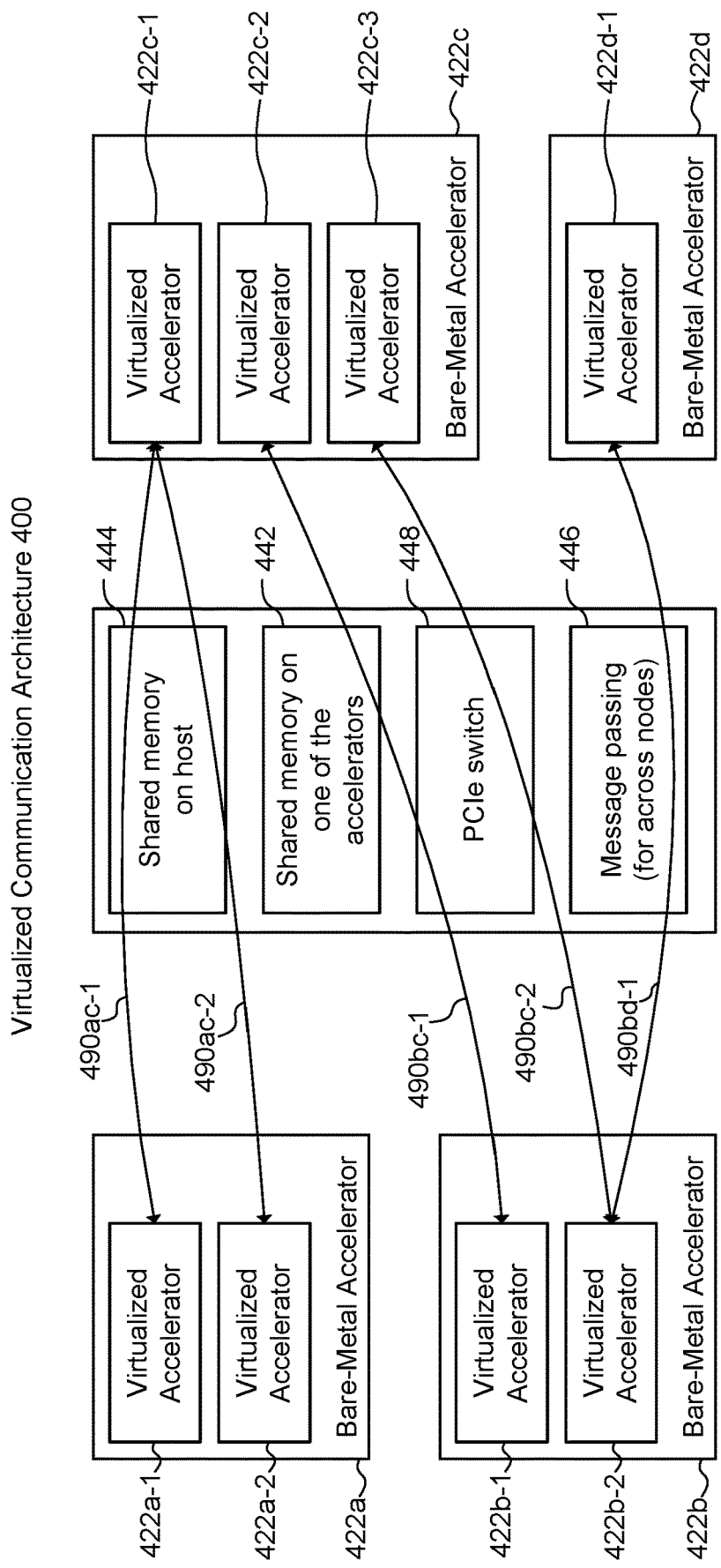
FIG. 4 illustrates a mapping of virtualized accelerators on top of a virtualized communication architecture, including data exchange between the virtualized accelerators, in accordance with one or more examples described herein.

Referring now to FIG. 4, an example mapping of virtualized accelerators 422*a*-1, 422*a*-2, 422*b*-1, 422*b*-2, 422*c*-1, 422*c*-2, 422*c*-3, 422*d*-1 on top of a virtualized communication architecture 400, including data exchange 490*ac*-1, 490*ac*-2, 490*bc*-1, 490*bc*-2, 490*bd*-1 between the virtualized accelerators, is illustrated. In an example, data exchange 490*ac*-1 is provided between virtualized accelerator 422*a*-1 and virtualized accelerator 422*c*-1. The figure also shows bare-metal accelerators 422*a*, 422*b*, 422*c*, 422*d*, and the virtualization of these bare-metal accelerators. For example, with virtualized accelerators 422*a*-1, 422*a*-2 on top of bare-metal accelerator 422*a*, it appears that multiple accelerators exist in place of the bare-metal accelerator 422*a*. Different communication methods (e.g., shared memory on host 444, shared memory on one of the accelerators 442, PCIe switch 448, and message passing (for across nodes) 446) may be used to allow this virtualized accelerator communication with other virtualized or bare metal accelerators seamlessly. Thus, even if a virtualized accelerator is used, it will still use the underlying communication architecture to communicate.

Figure 5:
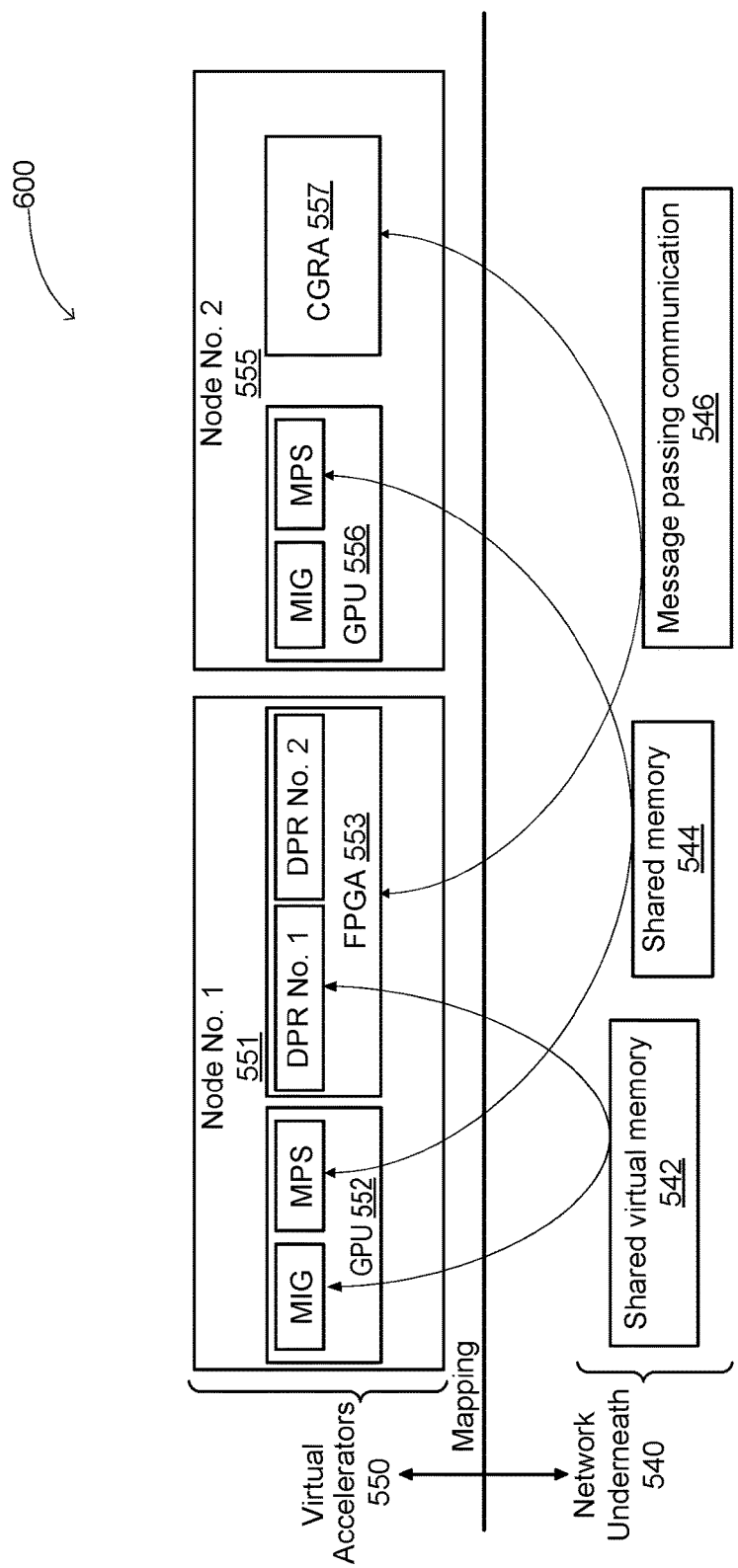
FIG. 5 illustrates an underlying memory-mapping implementation within multiple nodes, in accordance with one or more examples described herein.

Referring now to FIG. 5, an example underlying memory-mapping implementation 500 within multiple different nodes (i.e., Node No. 1 551 and Node No. 2 555) is illustrated. As shown in the figure, within the physical accelerators, there are different virtualized regions (i.e., virtualized accelerators 550). For example, in the FPGA 553, there are dynamic partial reconfiguration (DPR) regions (i.e., DPR No. 1 and DPR No. 2). Communication may occur within a node between the two accelerators (i.e., GPU 552 and FPGA 553), and more particularly between Multi-Instance GPU (MIG) (within GPU 552) and DPR No. 1 (within FPGA 553). This communication can be done through shared virtual memory 542. The communication across different nodes between the Multi-Process Service (MPS) within GPU 552 (within Node No. 1 551) and the MPS within GPU 556 (within Node No. 2 555), can go through shared memory 544. And the communication across different nodes between the FPGA 553 (within Node No. 1 551) and CGRA 557 (within Node No. 2 555), can be made through message passing communication 546. The various communications shared virtual memory 542, shared memory 544, message passing communication 546 are considered the network underneath 540. Given that the virtualized accelerators are on top of the network underneath, the programmer does not need to know what exactly occurs underneath. They can, therefore, focus on, for example, what two types of accelerators are needed in order to communicate between each other.

Figure 6:
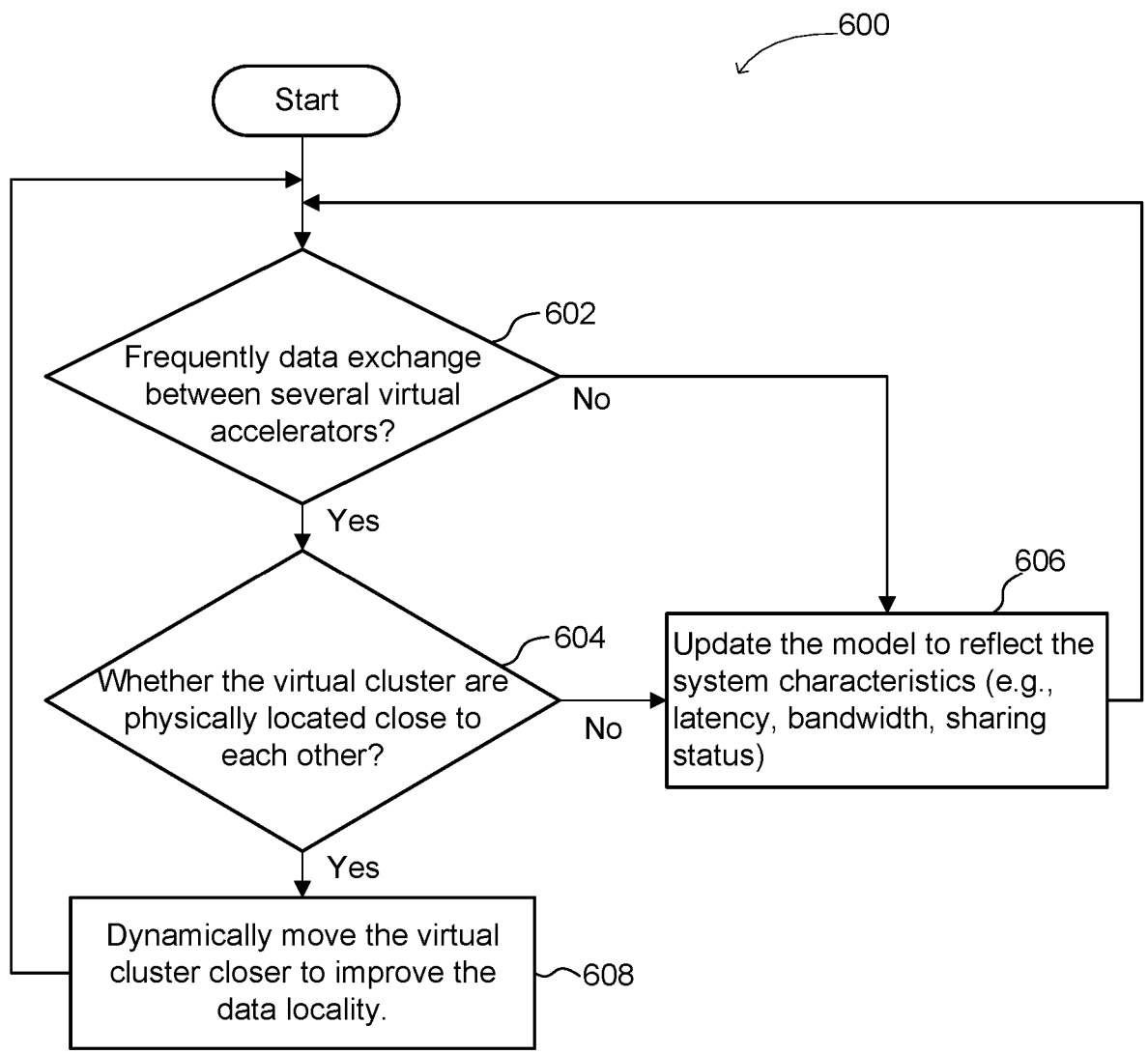
FIG. 6 is a flowchart illustrating an algorithm for self-adjusting the mapping of virtual accelerators to improve the communication architecture system efficiency (e.g., by reducing data movement), in accordance with one or more examples described herein.

FIG. 6 is a flowchart illustrating an algorithm 600 for self-adjusting the mapping of virtual accelerators to improve the communication architecture system efficiency (e.g., by reducing data movement). This figure shows how an example data pattern analysis and optimization of the overall system configuration is done to improve the efficiency of the communication architecture system. Based on the communication performance characteristics (e.g., latency, bandwidth, sharing status, etc.) between the different virtual accelerators, a check can be made as to whether there is a frequent data exchange between several virtual accelerators (step 602). If the answer if no, then the model is updated to reflect the system characteristics (e.g., latency, bandwidth, sharing status, etc.) (step 606), and if the answer is yes, then a decision is made as to whether the virtual accelerators (or virtual cluster) are physically located close to each other (step 604). If the answer is no, then the model is (possibly again) updated to reflect the system characteristics (e.g., latency, bandwidth, sharing status, etc.) (step 606), and if the answer is yes, then the virtual accelerators within the virtual cluster are dynamically moved closer to each other to improve the data locality (step 608).

Examples of the technology disclosed herein are also directed toward systems and methods for providing a dynamic communication architecture that can be used with large-scale multiple different workflows. These multiple different workflows can include, for example, artificial intelligence (AI), high performance computing (HPC), and data analytics (DA) workflows. The dynamic communication architecture can also be used with multiple heterogenous accelerators in a decentralized (i.e., serverless) configuration. Heterogeneous accelerators have different capabilities such as relating to memory capacity or the support for different dataflows. The support for different dataflows by different accelerators may relate to the ability for the accelerators to handle different workloads suited for diverse purposes, performance and energy efficiency factors, etc.

Various examples of the disclosed technology employ capabilities to map the decentralized heterogenous accelerators using corresponding decentralized virtualized accelerators. The mapping of corresponding decentralized virtualized accelerators is performed on top of, for example, a memory-mapped multi-accelerator communication architecture to enable effective and flexible sharing of data. To accomplish this, kernels are deployed on the different decentralized accelerators and the communication method/mechanism is setup to achieve optimal system efficiency based on accelerator communication characteristics. The mapping can be dynamically adjusted with regard to the workload running by analyzing workflow communication. More specifically, the mapping can be dynamically changed based on data communication patterns (using, for example, communication performance characteristics such as latency and/or throughput) and/or data locality.

Figure 7:
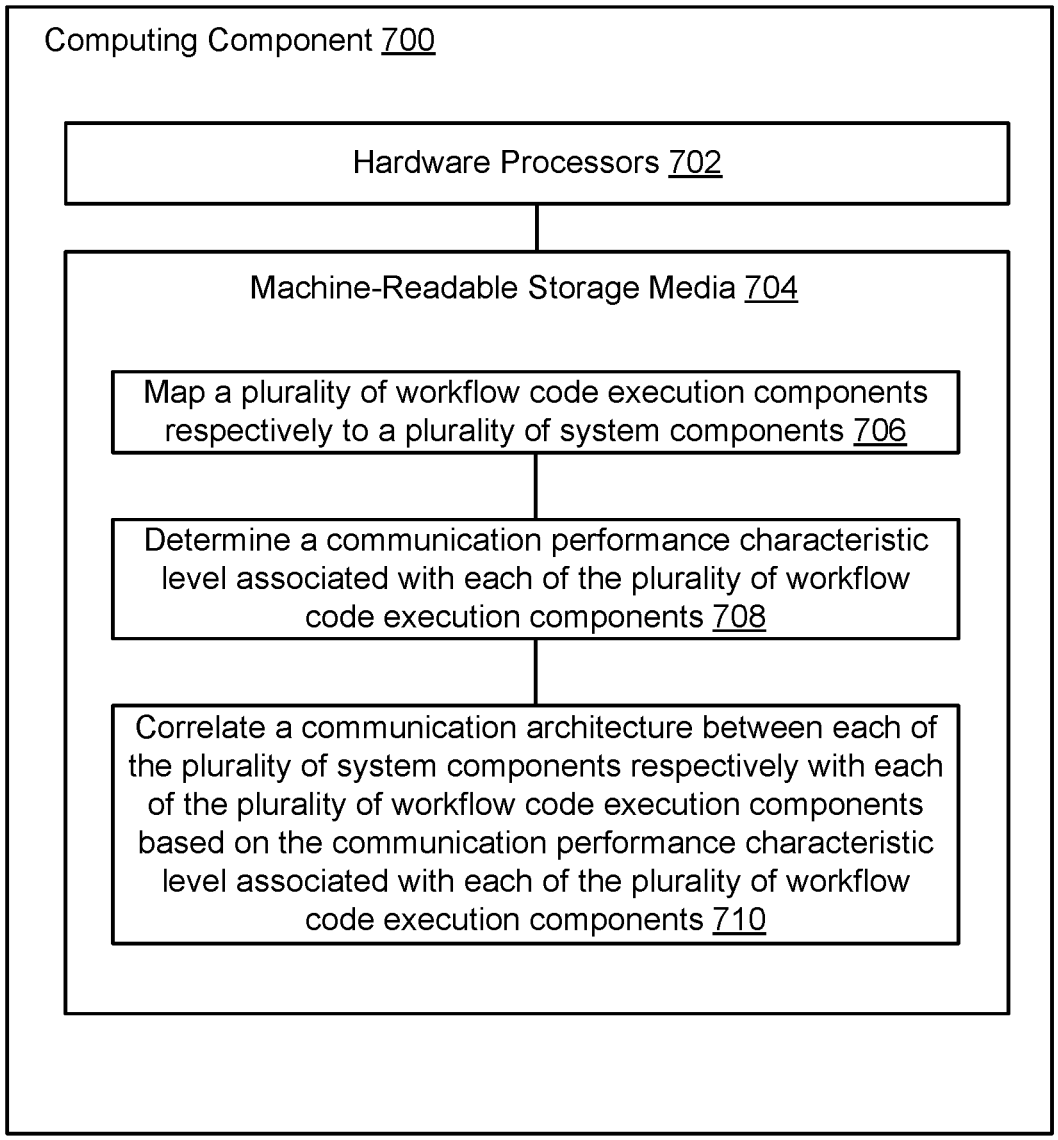
FIG. 7 is a computing component that may be used to implement various features of examples described in the present disclosure.

FIG. 7 illustrates an example computing component that may be used to implement the communication architecture system in accordance with various aspects of the disclosure. Referring now to FIG. 7, computing component 700 may be, for example, a server computer, a controller, or any other similar computing component capable of processing data. In the example implementation of FIG. 7, the computing component 700 includes a hardware processor 702, and machine-readable storage medium for 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-710, to control processes or operations for implementing the dynamically modular and customizable computing systems. As an alternative or in addition to retrieving and executing instructions, hardware processor 702 may include one or more electronic circuits that include electronic components for performing the functionality of one or more instructions, such as a FPGA, ASIC, or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-710.

Hardware processor 702 may execute instruction 706 to map a plurality of workflow code execution components respectively to a plurality of system components. The workflow code execution components are different segments/chunks that have been divided from amongst a workflow. The different chunks are mapped, respectively, to the system components. The system components can be, for example, a CPU, accelerator, GPU, etc.

Hardware processor 702 may execute instruction 708 to determine a communication performance characteristic level associated with each of the plurality of workflow code execution components. The determining of the communication performance characteristic level (which can comprise a measurement of latency and/or throughput) can be made using communication capability information derived from data exchange between each of the plurality of system components.

Hardware processor 702 may execute instruction 710 to correlate a communication architecture between each of the plurality of system components respectively with each of the plurality of workflow code execution components based on the communication performance characteristic level associated with each of the plurality of workflow code execution components. This allows the mapping to be dynamically adjusted with regard to the workload running by analyzing workflow communication. More specifically, the mapping can be dynamically changed based on data communication patterns (using, for example, communication performance characteristics such as latency and/or throughput) and/or data locality. In an example implementation of this, the communication architecture, which is between a pair of the system components and which is associated with the workflow code execution component with the greatest communication performance characteristic level, is given highest priority amongst the remaining communication architecture.

In some examples, the correlating of the communication architecture between two of the plurality of system components is made based on a comparison of communication performance characteristic levels between two of the workflow code execution components.

In some examples, the plurality of system components do not use a centralized server to communicate with each other.

In some examples, the plurality of system components comprise a CPU and at least one accelerator.

In some examples, the plurality of system components comprise multiple accelerators.

In some examples, the communication architecture comprises a memory mapping communication architecture, a peripheral component interconnect express (PCIe) communication architecture, an ethernet communication architecture such as Slingshot, compute express link (CXL), NVLink, etc., or an Infiniband communication architecture.

Figure 8:
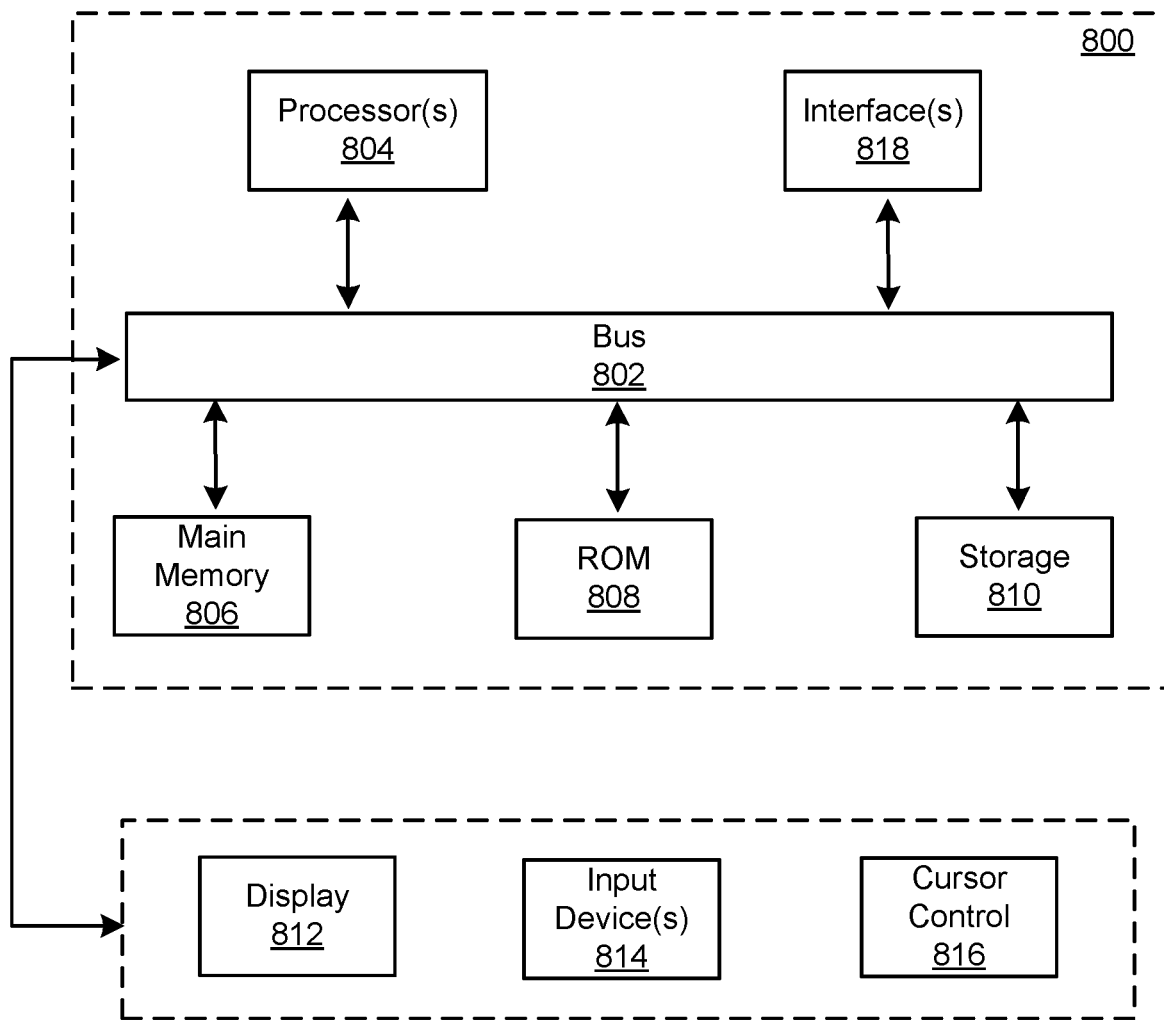
FIG. 8 depicts a block diagram of a computer system in which various features of examples described herein may be implemented.

FIG. 8 depicts a block diagram of an example computer system 800 in which various of the aspects described herein may be implemented. The computer system 800 may be used to execute machine readable instructions to perform the processes described herein.

The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read-only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some examples, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one example, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples of the disclosure include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable medium storing instructions that cause one or more processors of an electronic system to perform operations comprising:
    mapping a plurality of workflow code execution components respectively to a plurality of system components;
    determining a communication performance characteristic level associated with each of the plurality of workflow code execution components; and
    correlating a communication architecture between each of the plurality of system components respectively with each of the plurality of workflow code execution components based on the communication performance characteristic level associated with each of the plurality of workflow code execution components, wherein the correlating of the communication architecture between two of the plurality of system components is made based on a comparison of communication performance characteristic levels between two of the workflow code execution components.

2. The non-transitory machine-readable medium of claim 1, wherein the communication performance characteristic level comprises a measurement of latency and/or throughput.

3. The non-transitory machine-readable medium of claim 2, wherein the communication architecture, which is between a pair of the system components and which is associated with the workflow code execution component with the greatest communication performance characteristic level, is given highest priority amongst the remaining communication architecture.

4. The non-transitory machine-readable medium of claim 1, wherein the plurality of system components do not use a centralized server to communicate with each other.

5. The non-transitory machine-readable medium of claim 1, wherein the plurality of system components comprise a CPU and at least one accelerator.

6. The non-transitory machine-readable medium of claim 1, wherein the plurality of system components comprise multiple accelerators.

7. The non-transitory machine-readable medium of claim 1, wherein the communication architecture comprises a memory mapping communication architecture, a peripheral component interconnect express (PCIe) communication architecture, an ethernet communication architecture, or an Infiniband communication architecture.

8. The non-transitory machine-readable medium of claim 1, wherein the determining of the communication performance characteristic level is made using communication capability information derived from data exchange between each of the plurality of system components.

9. A method comprising:
    providing a communication architecture between a first system component and a second system component;
    identifying a workflow code execution component having a greatest communication performance characteristic level amongst other workflow code execution components; and
    associating the communication architecture with the workflow code execution component having the greatest communication performance characteristic level, wherein the method further comprises attributing highest priority to the communication architecture amongst other communication architecture provided between other system components.

10. The method of claim 9, wherein the communication performance characteristic level comprises a measurement of latency and/or throughput.

11. The method of claim 9, wherein the first system component and the second system component do not use a centralized server to communicate with each other.

12. The method of claim 9, wherein the first system component and the second system component comprise multiple accelerators.

13. The method of claim 9, wherein the identifying of the workflow code execution component having the greatest communication performance characteristic level is made using communication capability information provided by at least one of the first system component and the second system component.

14. A communication architecture system comprising:
a first system component;
a second system component;
a third system component;
a plurality of workflow code execution components;
a processor; and
a memory configured to store instructions that, in response to being executed by the processor, cause the processor to:
provide a first communication architecture between the first system component and the second system component;
provide a second communication architecture between the second system component and the third system component;
determine which of the first communication architecture and the second communication architecture has highest priority;
compare a speed of execution of the plurality of workflow code execution components;
identify which of the plurality of workflow code execution components has a greatest speed of execution based on the compare step; and
associate the workflow code execution component having the greatest speed of execution to the first communication architecture or the second communication architecture determined as having the highest priority.

15. The communication architecture system of claim 14, wherein the comparison of the speed of execution of the plurality of workflow code execution components comprises a comparison of measurements of latency and/or throughput.

16. The communication architecture system of claim 14, wherein the first system component, second system component, and third system component do not use a centralized server to communicate with each other.

17. The communication architecture system of claim 14, wherein the first system component, second system component, and third system component comprise a CPU and multiple accelerators.

18. The communication architecture system of claim 14, wherein the identifying of the workflow code execution component having the greatest speed of execution is made using communication capability information provided by at least one of the first system component, second system component, and third system component.

* * * * *